G. C. STAMPER.
Road Wagon.

No. 79,155.

2 Sheets—Sheet 1.

Patented June 23, 1868.

Witnesses
J. F. Colby
N. E. Colby.

Inventor.
G. Carter Stamper
By D. C. Colby
his Attorney

G. C. STAMPER.
Road Wagon.
No. 79,155.
2 Sheets—Sheet 2.
Patented June 23, 1868.
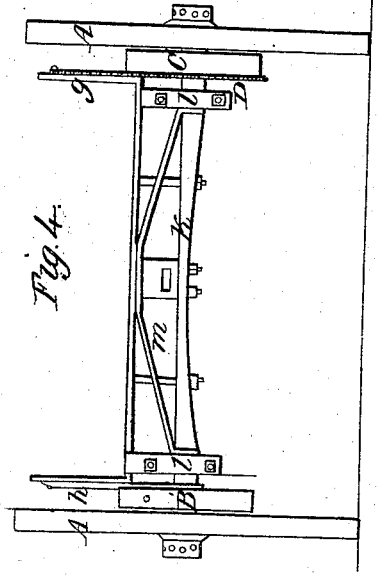
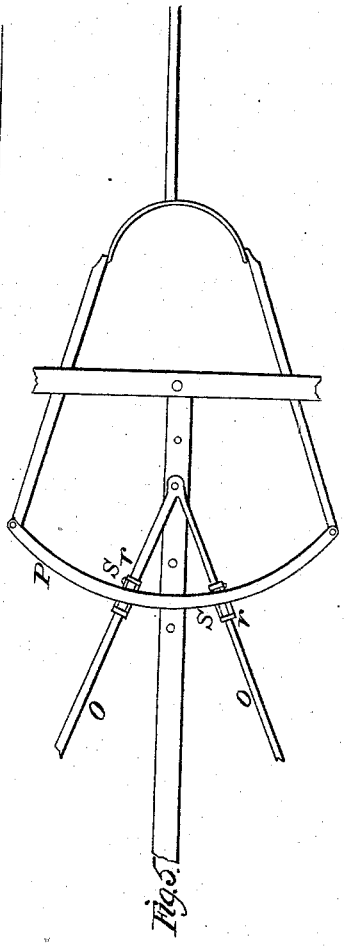
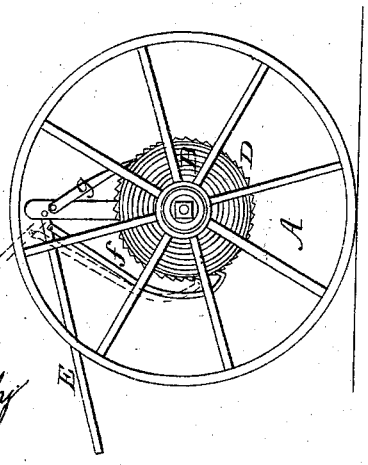
Witnesses
J. F. Colby
M. E. Colby
Inventor:
G. Carter Stamper
By D. C. Colby
his Attorney United States Patent Office.

G. CARTER STAMPER, OF PELLA, IOWA.

Letters Patent No. 79,155, dated June 23, 1868.

---

IMPROVEMENT IN WAGONS.

---

The Schedule referred to in these Letters Patent and making part of the same.

---

TO WHOM IT MAY CONCERN:

Be it known that I, G. CARTER STAMPER, of Pella, Marion county, in the State of Iowa, have invented new and useful Improvements in Wagons; and I do hereby declare the following to be a full and exact description of the same, reference being had to the drawings that accompany and form a part of these specifications, in which—

Figure 1:
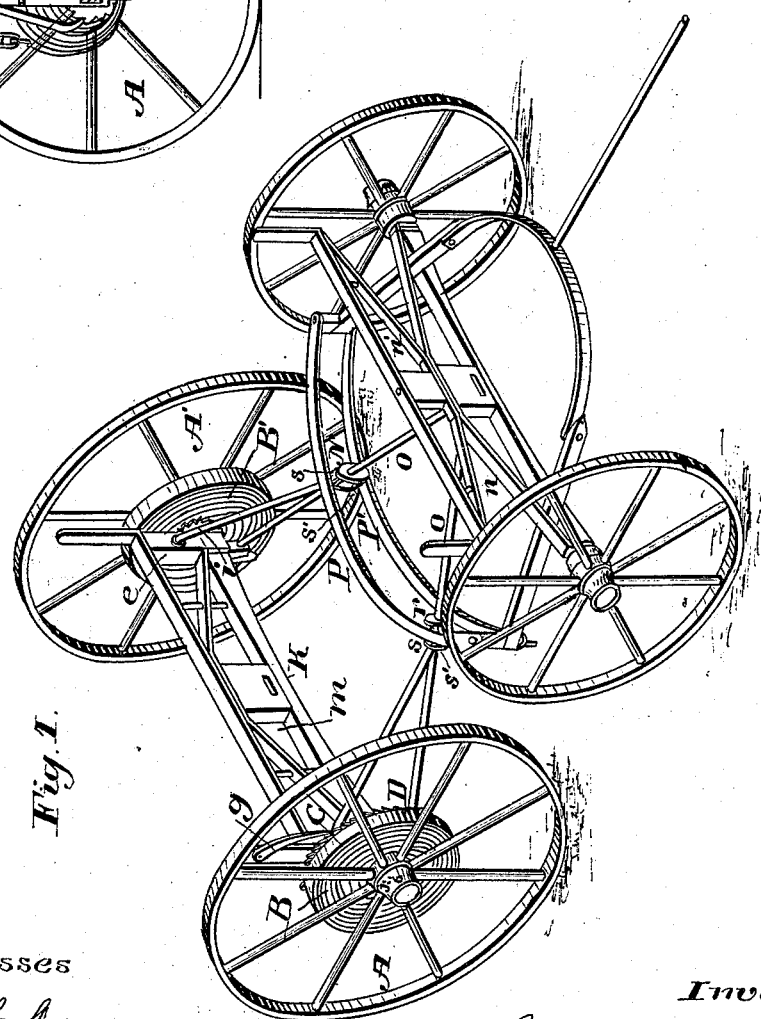

Figure 1 is a perspective view of the running-gear, exhibiting the appliances of my invention.

Figure 2:
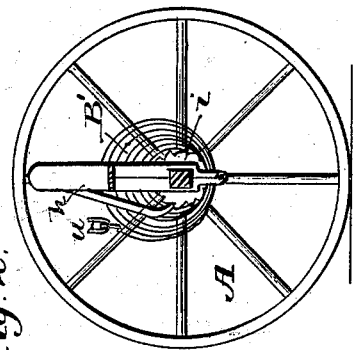

Figure 2, sectional view, one wheel detached, with spring and ratchet on the hub.

Figure 3, view of the other rear wheel, with spring, and the ratchet on the rim of the casing or housing of the spring—a method of attaching varying from that of fig. 2.

Figure 4, rear elevation of the axle and its immediate attachments.

Figure 5, view of a portion of the running-gear, illustrating the arrangement necessary in lengthening the reaches, for convenience in loading with long plank or timbers.

Letters A and A', the two rear wheels of the wagon.

Letters B and B', two plate-stud springs, one to each wheel.

Letter C, casing or housing for the springs B and B'.

Letter D, ratchet on the rim of the casing C.

Letter E, lever, with catch-hook, $f$, attached. With this lever the spring B is wound up.

Letter $g$, a pawl, holding the spring and its casing C as it is being wound.

Letter $h$, a pawl, catching into the ratchet on the hub of the wheel B'.

Letter $i$, ratchet on the hub of the wheel B'. To wind the spring when attached in this way, one end of which is attached to some immovable part aside from the wheel, as in fig. 2, the wheel needs to be raised from the ground, and itself revolved by a lever in the holes $j$, in the outer portion of the hub, shown in fig. 3.

Letter K, rear axle.

Letters L L, two standards, clamping the axle K, as in figs. 2 and 4.

Letter $m$, a spring-brace, each end resting on the axle near the hub of the wheel.

Letter $n$, spring-brace, for the front part, with corresponding part $n'$, to raise the front rest of the wagon-bed level with that of the rear, and to give great strength with lightness or little weight of parts.

Letters O O, the two rods forming the reach, to connect the front and rear wheels.

Letters P P, sliders, attached, as in fig. 1, one above and one beneath the rods O O.

Letters $r\ r'$, two sets of boxing, so formed as to slide on to the rods O O, as in figs. 1 and 5.

Letters $s\ s'$, rollers, two to each set of the boxing $r$—one on the upper part, one on the under side. These prevent all friction between the rods O and sliders P.

One object of my invention is to afford assistance to the team attached to a wagon when on a steep grade, or in a difficult place, by attaching, to the rear wheels, springs, in manner and to operate as hereinafter illustrated and explained. Another feature is to provide for stiffening and strengthening the axle; still further, to prevent the friction and consequent wear in the connecting-reaches and sliders of the running-gear.

Teamsters often come to bad places in the road they are compelled to travel, where no aid to their team is obtainable, and with loading of such a nature as to render it impossible to remove a part of it, and even when the load may be divided, and a return trip made for that which was left behind, the great loss of time makes this course very undesirable.

I attach a spring, as illustrated in the drawings, so that its full force may be brought to act directly on the wheel, to tend to rotate it.

I show two methods of attaching these springs B' and B. The former, as shown in fig. 2, has one end made fast to the hub, the other end to the hook $u$, attached to the bed-piece of the wagon-body. To wind up the spring, when attached in this manner, a carriage-jack is used to relieve the wheel from the ground, and a lever applied through the medium of the holes in the outer end of the hub, and the wheel turned backwards until the spring is wound close, the pawl $h$ catching, meantime, into the ratchet $i$ on the hub, as in fig. 2.

When the wheel has been lowered again, this pawl may be thrown over forward, or in any way removed from contact with the ratchet $i$.

The attachment of the spring B, as in fig. 3, is by one end made fast to the hub of the wheel, the other to the rim of the casing C. This method does not require the wheel to be raised at all, as the spring B is wound through the medium of the lever E, catch-hook $f$, ratchet D, and pawl $g$, the latter holding the casing C from turning back, as the lever E is each time brought down for a successive sweep. This latter method is preferred, as it is equally effectual, and much more convenient in manipulation. The wheel does not require to be raised, and the team can start the moment the springs are wound up.

I have represented the lever as operated from the rear, the operator on the ground, but by a slight change in the form of the hook $f$ the lever may be brought into position to be worked by one in the wagon or on the load.

These springs may be of great force, and, with suitable levers to wind them, made to yield from one to two thousand pounds of power, or be, under ordinary circumstances, equal to an additional horse, and, being constant in their action, would always give their aid in conjunction with whatever force was exerted by the team.

I do not claim broadly the application of springs to rotate axles or wheels, but their use as applied to wagon-wheels, so as to exert their force directly to rotate them without any intermediate wheels or gearing.

My device for strengthening the axle is the application of the spring-brace $m$, in conjunction with clamps L L, by which the load is thrown on the axle close to the hub of each wheel. The manner of this application will be readily understood from fig. 4.

On the front axle similar advantages are secured by the spring-brace $n$ and its counterpart $n'$.

My appliance to the connecting-rods O O, as well as to the sliders P P, to obviate friction and prevent the usual and destructive wear thereof, is of two rollers, $s\ s'$, to each of the connecting-rods O, in manner as hereinbefore described, and as illustrated in fig. 1.

The blocks $r\ r$, in which are the bearings for the journals of the rollers $s\ s'$, may be moved on the rods O O, as shown by fig. 5.

This provides for having the rollers in proper place when the reach is extended, as may often be desirable in case of drawing timber and the like.

The appliance of these springs B will not only be of great practical advantage in the case of team-wagons, but may be applied to wagons or sulkies used for breaking young horses to harness, and the use of the collar, as in many cases the dislike to the pressure of the collar upon the shoulders of the young horse is the reason of his refusing to go freely forward, and the animal gets the reputation of being stubborn, when in his disposition he is not so. The action of these springs at the start would induce the habit of starting off without difficulty.

What I claim as of my invention, and desire to secure by Letters Patent, is—

1. The springs B, when attached directly to and arranged to act directly upon the wheels of a wagon or other carriage, substantially as and for the purposes specified and set forth.

2. The anti-friction rollers $s\ s'$, when arranged upon the connecting-rods O O, substantially as and to operate as described.

3. The spring-brace $m$, as combined with the rear axle and the spring-braces $n$ and $n'$, for the front, substantially in the manner illustrated, and for the purposes set forth.

In testimony whereof, I have signed my name to this specification in the presence of two subscribing witnesses.

G. CARTER STAMPER.

Witnesses:
    D. C. COLBY,
    EDM. F. BROWN.